United States Patent [19]

Ohkubo et al.

[11] 4,051,284

[45] Sept. 27, 1977

[54] METHOD FOR PRODUCING HEAT RESISTANT SYNTHETIC RESIN TUBES

[75] Inventors: Noriyoshi Ohkubo; Nobu Kitamura, both of Hiratsuka, Japan

[73] Assignee: The Furukawa Electric Company Limited, Tokyo, Japan

[21] Appl. No.: 470,139

[22] Filed: May 15, 1974

[30] Foreign Application Priority Data

May 16, 1973 Japan .................................. 48-54370
Jan. 25, 1974 Japan ............................. 49-10437[U]

[51] Int. Cl.² ............................................... B29C 1/12
[52] U.S. Cl. .................................... 428/36; 264/214; 264/313; 156/246; 156/247; 156/296; 264/166; 264/213; 264/216; 428/398
[58] Field of Search ................... 156/167, 51, 56, 246, 156/247, 344, 249, 168, 296; 117/232; 264/166, 174, 212, 213, 334, 304, 261, 305, 313, 317, 214, 216, 149, 150, 215, 145, 209, 173; 249/183; 161/177; 428/35, 36, 398

[56] References Cited

U.S. PATENT DOCUMENTS

| 2,526,483 | 10/1950 | Ingmanson | 264/230 |
|---|---|---|---|
| 2,561,569 | 7/1951 | Flynn | 264/149 |
| 3,329,588 | 7/1967 | Mears | 264/317 |
| 3,564,661 | 2/1971 | Atwell | 249/183 |
| 3,642,531 | 2/1972 | Peterson | 117/232 |
| 3,666,596 | 5/1972 | Morton | 156/344 |
| 3,676,814 | 7/1972 | Trunzo et al. | 117/232 |
| 3,684,602 | 8/1972 | Ball | 156/247 |
| 3,726,712 | 4/1973 | Rieck et al. | 117/232 |

*Primary Examiner*—Charles E. Van Horn
*Assistant Examiner*—Michael W. Ball

[57] ABSTRACT

A method of manufacturing of a novel very fine seamless heat resistant synthetic resin tube having a wall thickness of not more than 0.3 mm, by applying a specific heat resistant synthetic resin varnish as defined in the specification on a metal wire and curing said resin varnish to form the synthetic resin layer on the metal wire, drawing the heat resistant synthetic resin coated wire above the yield point of the metal wire and separating the resulting synthetic resin tube from the metal wire.

The method of the present invention may produce a composite heat resistant synthetic resin tube in which a plurality of the above-described tubes are made to adhere tightly parallel with each other in the longitudinal direction or a double layer resin tube, one layer of which is a thermally adhesive synthetic resin and the other layer of which is the heat resistant resin.

28 Claims, No Drawings

METHOD FOR PRODUCING HEAT RESISTANT SYNTHETIC RESIN TUBES

The present invention relates to a novel method for producing heat resistant synthetic resin tubes having a thickness of not more than 0.3 mm.

Heretofore, a large number of insulating synthetic resin tubes have been used for electric wiring in apparatus. Recently, the apparatus have become small in size, so that the temperature in the apparatus has risen raised and for as the synthetic resin tubes used, fineness and further excellent heat deformation resistance and heat deterioration resistance has been required. However, the heat resistant resins are generally difficult to soften by heating and therefore it is difficult or impossible to fabricate said resins into tubes by extrusion as in the case of ordinary resins. Accordingly, the typical heat resistant synthetic insulating tubes that satisfy the above described requirements have been produced by slitting polyimide film with adhesive into a tape and winding said tape spirally.

However, the heat resistance of the above-described insulating tube produced from the heat resistant resin film, depends upon the heat resistance of the adhesive used and even at the temperature which the film itself can fully endure, the adhesive deteriorates or is softened and the tube is broken or the properties are lost. Furthermore, when such a spirally wound tube is produced from the film, a part of the width of the film is overlapped, so that the electric insulating property is determined by the portion where the thickness of the tube is smallest. Further the mechanical properties of said tube, such as tensile strength, elongation etc., depend upon this adhesive and are unsatisfactory. Furthermore, in this case, various steps, for example a step for producing a film from a starting resin, a step for applying an adhesive on the film, a step for slitting the thus treated film into a tape, a step for winding the tape on a mandrel and a step for curing the adhesive by a heat treatment, are necessary, resulting in high production cost for the tube.

The inventors have diligently studied developing a method for producing very fine heat resistant synthetic resin tubes without the above-described defects, which are excellent in heat resistance, electric properties and mechanical properties and found a method for producing quite novel heat resistant synthetic resin tubes. This process can provide at low cost, unique seamless tubes without the above-described defects of the spirally wound tubes.

The method of the present invention includes forming a tubular resin layer having a thickness of not more than 0.3 mm by applying and curing a heat resistant synthetic resin varnish, particularly defined hereinafter, on a metal wire, drawing the resin coated wire above the yield point of this wire to eliminate cohesion between the tubular resin layer and the wire and separating the tubular resin layer from the wire. This method can provide seamless fine heat resistant synthetic resin tubes having a small thickness, particularly not more than 0.3 mm, and an inner diameter of not more than 5.0 mm, which have never been obtained by the conventional process.

In the method of the present invention, it is necessary to eliminate the cohesion between the metal wire and the tubular resin layer formed thereon and in order to attain this object effectively it is preferable to carry out the following pretreatments or after-treatments prior to or after the above described various steps.

1. Silicone oil, silicone resin, hydrocarbon insulating oil, wax, water glass, phosphorous acid esters, hypophosphorous acid esters, phthalic acid esters, fatty acids and the like are applied or baked on the surface of the wire prior to coating of the heat resistant resin varnish.
2. The metal wire is passed through a heated furnace prior to coating of the heat resistant resin varnish to form an oxidized layer on the surface of the metal wire or the metal wire is coated with the resin varnish and passed through a heated furnace to form an oxidized layer on the surface of the metal wire while the curing of the resin proceeds.
3. The above described methods (1) and (2) are used together.
4. The resin coated wire is immersed in water or an organic solvent which does not dissolve the resin layer, such as alcohol, benzene, xylene and the like or the resin coated wire is brought into contact with the vapor of these liquids.

Among them, the method (1) wherein the surface of the metal wire is treated chemically, is highly effective and particularly, when a silicone resin is applied on the wire, the separation of the resin layer from the metal wire can be conducted most smoothly.

The term "heat resistant synthetic resin varnish" used herein means those having the following properties. That is, these varnishes are of such kind that when they are applied and cured on a copper wire of AWG (American Wire Gauge) No. 18 (diameter of 0.0403 inch) so that the overall diameter is increased by about 0.003 inch, the resin layer formed will have a thermal life of at least 20,000 hours at 12° C, when measured according to ASTM D 2307-68 and a cut-through temperature of at least 250° C, when measured according to ASTM D 1679-72. These resin varnishes are, for example varnishes of precursors of imide group-containing resins, such as polyimide, polyamideimide, polyesterimide, polyesteramideimide and the like, varnishes of the precursors of non-linear type polyesters, polyhydantoin, polyimidazopyrrolone and the like and the varnish of polyparabanic acid.

The term "precursors" used herein means those consisting mainly of the following substances. That is, in the case of polyimide and polyimidazopyrrolone, these substances are polyamide-acid or the esters thereof, in the case of polyamideimide, polyesterimide and polyesteramideimide, these substances are corresponding polyamide-acids and the esters thereof or low molecular weight polymers soluble in an organic solvent and having imide group in the molecule, in the case of non-linear type polyester, these substances are linear type polyester having carboxylic or hydroxylic group in the side chain of the linear molecules, which can be three-dimentionally bonded, and in the case of polyhydantoin, these substances are low molecular weight polymers soluble in an organic solvent and having hydantoin ring.

Among them, the varnish of the precursor of polyimide resin provides particularly high heat resistance, chemical resistance, mechanical properties and non-inflammability to the tube and is particularly preferable.

As the form of the above described various resin varnishes, any of the organic solvent type, water soluble type, emulsion type and non-solvent type may be used but the organic solvent type and water soluble type are particularly preferable, because they can provide particularly uniform resin layers.

The processes for applying these varnishes on the metal wire include dip-coating, electrodeposition coating and other processes and there is no particular limit to coating processes.

The curing of the heat resistant synthetic resin varnishes applied on the metal wires in the present invention can be effected by various processes including irradiation process but the process wherein the coated metal wire is passed through a heated furnace to cure the resin, is the simplest and preferable.

The reason why the thickness of the heat resistant synthetic resin tube produced by the method of the present invention is limited to not more than 0.3 mm, is as follows. In order to produce the tube having a large thickness according to the method of the present invention, it is most preferable to apply the dip-coating process, but the production of the tube having a thickness of more than 0.3 mm by this process needs very many repetitions of dipping, so that the production speed lowers and the reproduction cost increases. Further blistering often occurs during curing, consequently impairing the apparance of the coating.

The size of the inner diameter of the heat resistant resin tube produced in the method of the present invention is not particularly limited but the tubes having an inner diameter of not more than 5 mm are particularly easily produced. Because when the metal wire having a diameter of more than 5 mm is used, a large force is required in the drawing step, so that the production installation becomes expensive and further the production speed lowers, consequently the production cost becomes higher.

In the method of the present invention, the following objects can be attained by using at least two kinds of heat resistant resin varnishes in the following manner. By using a resin as an outer layer and another resin as an inner layer, the properties of the resin of the former layer being superior to those of the resin of the latter layer, the properties of the surface of the tube, for example abrasion resistance, cut-through resistance, chemical resistance and the like of the resulting tube can be improved. Furthermore, by using an expensive resin having good properties on the surface of the metal wire coated with less expensive resin, the total cost for the material can be reduced. For that purpose, the metal wire coated with at least two kinds of heat resistant resin varnishes is produced by using said resin varnishes and then the resin coated wire is subjected to the subsequent steps as mentioned above to obtain the heat resistant resin tube composed of at least two kinds of resin layers.

As the metal wires to be used in the present invention, use may be made of copper, aluminum, iron, gold and silver wires and plated wires, such as nickel plated copper wire, chromium plated aluminum wire and the like but copper wire is preferably preferable it is cheap and is easy to draw and regenerate.

The cross-sectional shape of the metal wire may be circular, oval, hexagonal, square and triangular.

An explanation will be made with respect to the drawing step of the heat resistant resin coated metal wire according to the present invention. In order that the cohesion of the metal wire and the tubular resin layer is eliminated through the drawing, the outer diameter of the drawn wire should be smaller than the inner diameter of the tubular resin layer but when the drawing is made within the elastic limit of the metal wire, if the tension is removed, the metal wire is returned to the original outer diameter, so that the separation of the tubular resin layer from the metal wire becomes difficult. Accordingly, the drawing of the metal wire in this step must cause the plastic deformation by drawing the metal wire above the yield point of the metal wire. However, the upper limit must be within the yield point of the coated resin layer for obtaining the tube having a desired inner diameter.

If the metal wire is treated in such a manner, when the outer force is removed after drawing, the metal wire keeps the drawn length, while the coated resin layer returns to the original state prior to the drawing in both the inner diameter and the length, so that the separation of the coated resin layer from the metal wire can be easily conducted.

In the present invention, the step for drawing the resin coated metal wire can be effected as follows.

1. The resin coated wire is wound on a rotary roll in an appropriate number of turns and then said wire is wound on another rotary roll in an appropriate number of turns and the diameter and/or the rotation rate of these two rolls are varied to adjust the elongation of the wire in continuous drawing operation.
2. The resin coated metal wire is drawn by means of a die in the same manner as in the drawing of a usual metal wire.
3. The resin coated metal wire is cut into an appropriate length and then both ends are fixed by an optional manner and the fixed resin coated metal wire is drawn.

Of the above processes, (1) and (2) are preferable in that they are continuous processes suitable for a mass production and can reduce the production cost.

The step for separating the resin tube from the drawn resin coated metal wire may be effected by cutting the resin coated metal wire into a desired length or cutting only the tubular resin layer by any optional manner. Then, the tubular resin layer immediately shrinks in the longitudinal direction and simultaneously increases in inner diameter separating from the metal wire. The resin tube can then be easily obtained by pulling out the metal wire.

The resin tube after the separation retains more or less strain received in the drawing process and there is the possibility of the tube making dimensional change while in use, so that it is desirable to treat the resin tube at a temperature of 100°–300° C after the resin tube is separated. If the heat treatmentis conducted prior to the separation, the tube shrinks completely to its original size before the drawing, and becomes easier to separate from the metal wire.

According to the method of the present invention, it is also possible to produce a composition heat resistant resin tube in which two or more heat resistant resin tube are tightly adhered in a side-by-side relation or in a bundle form, by coating two or more metal wire individually and repeatedly with the heat resistant resin varnish, and after such repeated coating, bringing the resin-coated wires, with the outermost layer uncured, into contact with each other in a parallel or bundled arrangement, which is then cured, and if necessary, continuing the coating and curing until a desired wall thickness is obtained.

Furthermore, in the method of the present invention, the following specific heat resistant resin tubes can be produced. That is, prior to application of the heat resistant synthetic resin varnish on the metal wire, a varnish composed of a resin having a high melting point such as phenoxy resin, polyamide resin, polysulfone resin, epoxy resin and the like or the mixtures thereof, or a heat adhesive composition consisting of a mixture of the above described resin and the precursor of the heat resistant resins, such as polyamide, polyamideimide and the like, is applied on the metal wire and then the resuling resin coated wire is additionally coated with the heat resistant resin varnish to form double-coated tubular layers on the metal wire and the thus double-coated wire is treated in the same manner as mentioned in the production of the single tube in the subsequent steps, whereby a double synthetic resin layer tube having a heat adhesive layer in the inner layer can be obtained. For example, when such a double layer tube is slipped over a joint of electric wires with heat resistant resin insulation and heated, the tube fixes on the jointed electric wires.

Furthermore when the heat resistant resin varnish is applied on the metallic wire and then a heat adhesive layer as mentioned above is applied thereon and the resulting double-coated wire is treated in the same manner as mentioned in the production of the single layer tube in the subsequent steps, a double synthetic resin layer tube having a heat adhesive layer in the outer layer can be obtained.

When a plurality of such tubes are made to contact with each other or with other material and heated as they are or after being treated with a solvent, a firm adhesion is formed between them.

As mentioned above, the present invention can provide far more excellent insulating tubes made of heat resistant synthetic resins than conventional tubes obtained by spirally winding a heat resistant resin film with adhesive and further the tubes having a very small thickness and a small inner diameter can be produced. Accordingly, if various heat resistant resin tubes produced by the method of the present invention are used, high density wiring, which have never been obtained by a fluoroplastic tube which is larger in wall thickness and diameter, can be obtained. In addition to the use for electric insulators, the tubes can be applied for reverse osmosis, which is an important application for small size synthetic resin tubes, proving to have very high commercial value.

The following examples are given for the purpose of illustration of this invention and are not intended as limitations thereof.

EXAMPLE 1

A silicone resin (Trademark: Silicone KS 701, made by Shinetsu Kagaku Co.) was applied once on a copper wire having a diameter of 0.5 mm, passed through a baking furnace having a length of 4 m and kept at a temperature of 400° C, at a velocity of 6 m/min, to form a thin silicone resin layer on the wire, and successively a polyimide precursor varnish (Trademark: ML Varnish, made by Du Pont Co., main component: polyamide-acid) was applied and cured 12 times on the above treated wire, while the wire was passed through the furnace at the same velocity, to obtain a resin coated wire, 49 μ in the thickness of the coated layer, which was taken up on a bobbin.

The resin coated wire was taken out from the bobbin, and wound in 10 turns around a rubber coated roll having a diameter of 50 cm and further in 10 turns around another rubber coated roll having a diameter of 50 cm which is arranged at a distance of about 2 m from the first roll and finally wound aroound a take-up bobbin. Then, the rotating rates of the two rolls were adjusted so as to draw the wire to about 121% of its original length between the two rolls. The wire was then taken up on a take-up bobbin while being drawn continuously. Then, the resin coated wire was taken out from the take-up bobbin, and only the tubular resin layer was cut at about 1 m intervals. The wire was subsequently passed twice through a furnace kept at a temperature of 300° C to cause the resin layer to shrink sufficiently, and the wire was taken up on another bobbin. Then, the wire was cut-off at the portions where the copper wire was exposed, and the copper wires were pulled out to obtain polyimide resin tubes.

The physical properties of the resulting polyimide resin tube were compared with those of commercially available polyimide tube having a thickness of 80μ and an inner diameter of about 0.5 mm, prepared by spiral winding a polyimide film with adhesive.

The results obtained are shown in the following Table 1.

Table 1

|  | Present invention | Conventional |
|---|---|---|
| Thickness (μ) | 49 | 80 |
| Breakdown voltage (KV)* | 11 | 8 |
| Tensile strength (Kg) | 1.3 | 0.7** |
| Elongation (%) | 81 | 7** |

Note:
*Breakdown voltage was measured in the following manner.
The resin tube in which was inserted a copper wire having a diameter of 0.48 mm was immersed in mercury over a length of 8 cm, and a voltage was applied between the copper wire and mercury and stepped up until the resin tube was broken.
**Tensile strength and elongation at a point where the tubular shape is lost.

It is clear from the above table that the polyimide tube according to the present invention is superior to the conventional polyimide tube.

EXAMPLE 2

According to the process described in Example 1, the resin varnish was applied and cured on the copper wire 12 times to form a tubular resin layer having a thickness of 49 μ. Then, a cresol solution of a mixture of 40% of polysulfone resin and 60% of phenoxy resin was applied and baked 4 times on the resin layer to prepare a resin coated wire having a 15 μ-thick thermoplastic resin layer as the outermost layer. The resulting resin coated wire was treated in the same manner as described in Example 1 to obtain a double synthetic resin layer tube having a thickness of 64 μ, whose outermost layer was composed of the thermoplastic resin. The physical properties of the resulting composite synthetic resin tube are shown in Table 2.

When two of the double resin layer tubes were gathered and heated at 250° C for 3 minutes, the two tubes adhered to each other integrally. Further, when an aluminum wire having a diameter of 0.45 mm was inserted into the double resin layer tube and 10 such tubes containing aluminum wire were bundled with a Teflon tape and heated at 250° C for 5 minutes to obtain a composite polyimide tube, in which 10 tubes are integrally combined in firm adhesion.

EXAMPLE 3

A polyimide resin precursor varnish (main component: polyamide-acid ester), which is a cresol solution of the precursor synthesized from benzophenonetetracarboxylic acid dianhydride and aromatic diamine, was applied on a copper wire having a diameter of 1.0 mm, and the resin varnish coated wire was passed through a baking furnace having a length of 4 m and kept at a temperature of 400° C, at a velocity of 3.5 m/min to cure the varnish on the wire. This process was repeated 12 times to obtain a resin coated wire, 50 μ in the thickness of the resin layer. Then, the wire was continuously drawn to 130% of its original length, by means of a drawing die. When the resin coated wire was cut into a length of about 1 m, the resin layer cured on the copper wire shrunk and the copper wire was exposed at both ends of the resin coated wire. AS a result, a polyimide tube was easily obtained by pulling out the copper wire.

The resulting polyimide tube was heated and shrunk for 30 minutes in an air oven kept at 250° C to obtain a polyimide tube having a good heat stability which was free from further shrinkage even when heated at 250° C.

The physical properties of the resulting polyimide tube are shown in Table 2.

EXAMPLE 4

A polyimide precursor varnish (ML Varnish used in Example 1) was applied and cured 10 times on a copper wire having a diameter of 1.0 mm, through a baking furnace having a length of 3 m and kept at a temperature of 400° C at a velocity of 4 m/min, to obtain a polyimide resin coated copper wire having a thickness of the layer being 52 μ.

The resulting resin coated wire was cut into a length of 1 m and directly drawn 36% longer. A pull was given the copper wire to separate the resin coating from it. But the wire would not be pulled out, and a tube was not obtained.

On the other hand, a polyimide resin coated wire was immersed in water at room temperature for 5 hours, while another was immersed in hot water at 90° C for 1 hour. The wires were then cut into a length of 1 m and drawn 35% longer. In both cases, the resin layers shrunk to such an extent that both ends of each resin coated wire were exposed and the copper wires were easily pulled out and the polyimide tubes were easily obtained. The resulting tubes were heated at 250° C for 30 minutes to evaporate water and to cause heat shrinkage. The resulting tubes had no further shrinkage and were flexible.

The physical properties of the resulting polyimide tube are shown in Table 2.

EXAMPLE 5

A rectangular copper wire having a thickness of 2 mm and a width of 4 mm was passed once through a baking furnace having a length of 5 m and kept at a temperature of 400° C, at a velocity of 3 m/min. Then, an insulating oil (Trademark: Suniso 4GS, made by Sun Oil Co.) was applied slightly to the above treated wire and then a polyamideimide precursor varnish (main component: low molecular weight polyamideimide) obtained by reacting equimolar amounts of trimellitic anhydride and diphenylmethane diisocyanate in N-methylpyrrolidone was applied and cured 10 times on the wire while the wire was passed through the furnace at the same velocity, to obtain a polyamideimide resin coated wire, 60 μ in the average thickness of the layer. The resulting resin coated wire was cut into a length of 1 m, and the wire, after being fixed to a drawing machine at both ends, was drawn 39% longer and then the fixed portions of the wire were cut off, after which the wire was heat treated at 250° C for 10 minutes. In the wire thus treated, the copper wire was easily pulled out and a polyamideimide tube having a rectangular cross-section was obtained.

The physical properties of the resulting polyamideimide tube are shown in Table 2.

EXAMPLE 6

A cresol solution of a polyamideimide resin precursor prepared mainly from trimellitic anhydride and diphenylmethane diisocyanate was applied on an aluminum wire having a diameter of 1.0 mm, and the resin varnish coated wire was passed through a furnace having a length of 3.5 m and kept at a temperature of 390° C, at a velocity of 3 m/min to cure the resin on the wire. This process was repeated 14 times to obtain a polyamideimide resin coated aluminum wire, 70 μ in the thickness of the layer, which was taken up on a bobbin. After the resulting resin coated aluminum wire was heated for 6 hours in an air oven kept at 220° C, the wire was taken out from the oven an drawn to 125% of its original length and cut into a length of 1 m. Then, the resin layer shrunk and the aluminum wire was exposed at both ends of the resin coated wire. The aluminum wire was pulled out to obtain a polyamideimide tube having a thickness of 70 μ.

The physical properties of the resulting polyamideimide tube are shown in Table 2.

EXAMPLE 7

The same polyimide precursor varnish as used in Example 1 (ML Varnish) was applied and cured on two copper wires having a diameter of 0.5 mm separately while the wires were passed through a baking furnace having a length of 4 m and kept at a temperature of 400° C, at a velocity of 5 m/min. This process was repeated 13 times to form a resin layer having a thickness of about 55 μ. Then, said two wires, after being coated with the varnish once more, were contacted lengthwise with each other and passed through the furnace at the same velocity, whereby the two resin coated wires were firmly adhered to each other. The two adhering resin coated wires were cut into a length of about 50 cm, and were fixed at both ends to a drawing machine and drawn 37% longer. Then the fixed portions of the wire were cut off. But, the coated layer did not shrink, and it was impossible to pull-out the copper wire.

On the other hand, two copper wires were firstly passed through a furnace having a length of 2.5 m, in which atmosphere is air, to oxidize the surface of the copper wires, and then coated with ethyl silicate once and baked to form a thin ethyl silicate coating on the wires. The two wires thus treated were coated and cured with the above-described varnish and made to adhere lengthwise to each other in the same manner as described-above and the two adhering wires were drawn to 135% of their original length, and then cut into a length of 1 m. Then the coated layers shrunk and both ends of each wire were exposed. The wires were easily pulled out and a composite polyimide tube in which the two tubes integrally adhere, was obtained.

The physical properties of the resulting composite tube are shown in Table 2.

EXAMPLE 8

The same silicone resin as used in Example 1 was applied and baked once on a copper wire having a diameter of 0.2 mm, while the wire was passed through a baking furnace having a length of 4 m and kept at a temperature of 400° C, at a velocity of 3.5 m/min, to form a thin silicone resin layer on the wire, and successively a polyimide precursor varnish (ML Varnish) was applied and cured thereon 10 times, while the wire was passed through the furnace at the same velocity, to obtain a resin coated wire, 40 μ in the thickness of the coat, which was taken up on a bobbin. The resulting resin coated wire was drawn to 115% of its original length by means of two rubber coated rolls described in Example 1, and then cut at 1 m intervals. Since the cohesion between the resin tube and the copper wire had been eliminated, the copper wire was separated from the tube to obtain a polyimide tube.

The physical properties of the resulting polyimide tube are shown in Table 2.

EXAMPLE 9

The same silicone resin as used in Example 1 was applied and baked once on a copper wire having a diameter of 2 mm, while the wire was passed through a baking furnace having a length of 4 m and kept at a temperature of 400° C, at a velocity of 3 m/min, to form a thin silicone resin layer on the wire, and successively a non-linear type polyester varnish containing no solvent (a melted product of a resin compound composed of a low melting point resin, which is obtained by reacting dimethyl terephthalate with more than equivalent of a mixture of ethylene glycol and glycerine, and mixed with 5% by weight, based on the resin, of tetrabutyl titanate) was applied and cured on the above treated wire 7 times, while the wire was passed through the furnace at the same velocity, to produce a copper wire coated with a resin layer having a thickness of 0.2 mm, which was taken up on a bobbin. Then, the resulting resin coated wire was wound in 5 turns to form a coil having a circumference of 2 mm, and the opposite ends of the coil in the diameter direction were fixed to a tensile tester type drawing machine, and the wires were drawn to about 120% of its original length. When the fixed portions of the wires were cut, tubes were separated from the copper wires. Then, the copper wire was pulled out to separate the tube, and the tube was heated for 30 minutes in an air oven kept at 150° C to obtain a non-linear type polyester tube free from further heat shrinkage.

The physical properties of the resulting non-linear type polyester tube are shown in Table 2.

EXAMPLE 10

The same silicone resin as used in Example 1 was applied and baked once on a copper wire having a diameter of 1.2 mm, while the wire was passed through a baking furnace having a length of 5 m and kept at a temperature of 350° C at a velocity of 4 m/min, to form a thin silicone resin layer on the wire, and successively a 20% N-methylpyrrolidone solution of polyparabanic acid resin (Type E, made by Exxon Chem., Co.) was applied and cured on the above treated wire 12 times, while the wire was passed through the furnace at the same velocity, to produce a resin coated wire, 60 μ in the thickness of the coated layer, which was taken up on a bobbin. Then, the resin coated wire was drawn to 110% of its original length by means of two rubber coated rolls described in Example 1, and cut into a length of 1 m. Since the cohesion between the copper wire and the tube had been eliminated, the tube was separated from the copper wire and then treated for 15 minutes in an electric thermostat kept at 250° C to obtain a polyparabanic acid tube free from further heat shrinkage.

The physical properties of the resulting polyparabanic acid tube are shown in Table 2.

EXAMPLE 11

The same silicone resin as used in Example 1 was thinly applied and baked once on a copper wire having a diameter of 1.0 mm, while the wire was passed through a baking furnace having a length of 4 m and kept at a temperature of 400° C, at a velocity of 8 m/min, and successively a water soluble polyimide precursor varnish (aqueous solution of amine salt of polyamide-acid) applied and cured 10 times on the above treated wire, while the wire was passed through the furnace at the same velocity, to produce a copper wire coated with a 40 μ-thick resin layer. Then, the resin coated wire was drawn to 130% of its original length by means of two rubber coated rolls described in Example 1, and cut into a length of 1 m. Since the cohesion between the tube and the copper wire had been eliminated, the copper wire was separated from the tube, and the tube was heted for 15 minutes in an air oven kept at 300° C to obtain a polyimide tube free from further heat shrinkage.

The physical properties of the resulting polyimide tube are shown in Table 2.

EXAMPLE 12

The same silicone resin as used in Example 1 was thinly applied and baked once on a copper wire having a diameter of 0.5 mm, while the wire was passed through a baking furnace having a length of 4 m and kept at a temperature of 400° C, at a velocity of 3.5 m/min, and successively a non-linear type polyester precursor varnish (a cresol solution of the resin compound used in Example 9) was applied and cured 10 times on the above treated wire, while the wire was passed through the furnace at the same velocity, to produce a copper wire coated with a 40 μ-thick resin layer. The resulting resin coated wire was drawn to about 120% of its original length by means of a drawing die, and cut into a length of 1 m. Since the cohension between the copper wire and the tube had been eliminated, the tube was separated from the copper wire to obtain a non-linear type polyester tube. The resulting tube was heated in an air oven kept at 150° C for 30 minutes to obtain a tube free from further heat shrinkage.

The physical properties of the resulting non-linear type polyester tube are shown in Table 2.

EXAMPLE 13

The same silicon resin as used in Example 1 was thinly applied and baked once on a copper wire having a diameter of 0.8 mm, while the wire was passed through a baking furnace having aa length of 4 m and kept at a temperature of 400° C, at a velocity of 3.5 m/min, and successively a varnish prepared by dissolving a mixture composed of 40% of polysulfone resin and 60% of phenoxy resin in cresol was applied and baked on the above treted wire 3 times while the wire was passed through the furnace at the same velocity. Then, a polyimide precursor varnish (ML Varnish) was applied and cured on the above formed resin layer 12 times, while the wire was passed through the furnace at the same velocity, to obtain a copper wire coated with a double esin layer, 60 μ in total thickness. The resulting resin coated wire was drawn to 125% of its original length by means of two rubber coated rolls described in Example 1 and then cut into a length of 1 m. The copper wire was pulled out, and the resulting tube was heated at 200° C for 30 minutes to obtain a double layer tube free from further heat shrinkage. The properties of the resulting double layer tube are shown in Table 2.

From an end portion of each of the two polyimide enameled copper wire, 0.5 mm in diameter and 40 μ in the thickness of polyimide layer, was removed from the polyimide layer and the exposed copper wires were slver soldered in a butted position. The double layer tube obtained was cut off in a 2 cm-long pieces, and the soldered portion was covered with the tube piece, heated at 250° C and then cooled. As a result, the inner surface of the double layer tube adhered to the joint portion of the enameled wires, and the joint portion was covered with an insulating tube having a breakdown voltge of 10 KV, which did not slip off the joint portion.

EXAMPLE 14

A pyridine solution of benzophenonetetracarboxylic acid dianhydride was reacted with an aqueous solution of diaminodiphenylmethane to prepare a solution of a polyamide-acid in a water-pyridine mixed solvent. The resulting solution was fed into an electrodepositing bath. An iron tube having a thickness of 0.5 mm and an inner diameter of 5 cm was used as a cathode, and a copper wire having a diameter of 0.5 mm was used as an anode. A direct current of 2 V was applied to the bath and the copper wire was passed through the bath at a velocity of 5 m/min to deposite the polyamide-acid on the copper wire. After being washed with water, the copper wire was passed through a baking furnace having a length of 4 m and kept at an inlet temperature of 100° C and an outlet temperature of 400° C, whereby a copper wire coated with a 20 μ-thick polyimide resin layer was obtained. The resulting resin coated wire was cut into a length of 2 m and was drawn 20% longer. When the wire was immersed in a water at 60° C for 3 hours, the cohesion between the tube and the copper wire was eliminated, and the copper wire was easily pulled out. The resulting tube was dried in a drier kept at 100° C to obtain a polyimide tube.

The physical properties of the resulting polyimide tube are shown in Table 2.

EXAMPLE 15

The same silicone resin as used in Example 1 was thinly applied and baked one time on a copper wire having a diameter of 0.5 mm while the wire was passed through a baking furnace having a length of 4 m and kept at a temperature of 400° C at a velocity of 5 m/min, and successively a polyesterimide precursor varnish (a cresol solution of a low moleuclar weight condensate of diimidedicarboxylic acid, which was obtained by reacting trimellitic anhydride with diphenylmethane diisocyanate, with ethylene glycol) was applied and cured 7 times on the above treated wire, while the wire was passed through the furnace at the same velocity, to form a polyesterimide resin layer having a thickness of 30 μ on the wire, and further the same polyimide precursor varnish as used in Example 1 was applied and cured 3 times on the polyesterimide resin layer, while the wire was passed through the furnace at the same velocity, to form a polyimide resin layer having a thickness of 10 μ on the previously formed polyesterimide resin layer, whereby a double resin coated copper wire, 40 μ in total thickness of the layer, was obtained. The resulting resin coated wire was drawn, heat treated and cut in the same manner as described in Example 1 to obtain a double layer tube composed of an inner layer of polyesterimide and an outer layer of polyimide. The physical properties of the resulting resin tube are shown in Table 2.

The cut-through temperature of the tube thus obtained was compared with that of the polyimide tube of the same size obtained in Example 1. That is, a copper wire having a diameter of 0.48 mm was inserted into each tube and the cut-through temperature of each tube was measured according to ASTM D 1679–72. It was found that the cut-through temperature of the polyimide tube of Example 1 was 463° C, and that of the double-layer tube of this Example 15, 455° C. For comparison, only the polyesterimide varnish used in this Example 15 was used, and a tube having the same size as that of the tube of this Example 15 was produced and the cut-through temperature was measured in the same manner as described in this Example 15. The resulting polyesterimide tube had a cut-through temperature of 352° C. That is, inspite of the fact that more than half of the polyimide varnish was replaced by polyesterimide varnish which costs far less than as compared with polyimide varnish, a tube having an excellent cut-through resistance was obtained.

EXAMPLE 16

By using a baking furnace having a length of 4 m and kept at a temperature of 400° C, the same silicone resin as used in Example 1 was thinly applied and baked once on a copper wire having a diameter of 0.5 mm at a velocity of 5 m/min, and successively the same polyimide precursor varnish as used in Example 1 was applied and cured 8 times thereon and further the same polyamideimide precursor varnish as used in Example 5 was applied and cured 4 times on the above formed polyimide resin layer to obtain a copper wire coated with a double resin layer, the inner layer being a 30 μ-thick polyimide layer and the outer layer being a 15 μ-thick polyamideimide layer. The resulting double resin coated wire was treated in the same manner as described in Example 1 to obtain a double layer resin tube free from further heat shrinkage, the inner polyimide layer and the outer polyamideimide resin layer.

The abrasion resistance of the resulting tube was compared with that of the polyimide tube obtained in Example 1. That is, a copper wire having a diameter of 0.48 mm was inserted into each tube and the frequency of the movements of knife edge of an abrasion resistance tester, was measured according to JIS C 3203 until the tube was worn. In the polyimide tube, the copper wire was exposed after the knife was moved 15 times. While, in the polyimide tube having polyamideimide layer as the outer layer, the copper wire was exposed after 370-time movement of the knife edge. Accordingly, it was found that the abrasion resistance of the surface of polyimide tube having the highest heat resistance was remarkably improved by the double-layer structure as shown in this Example 16.

Table 2

| Example No. | 2 | 3 | 4 | 5 | 6 | 7 | 8 | 9 | 10 | 11 | 12 | 13 | 14 | 15 |
|---|---|---|---|---|---|---|---|---|---|---|---|---|---|---|
| Construction of resin layer | Inner layer: polyimide Outer layer: adhesive layer | Poly-imide | Poly-imide | Poly-amide-imide | Poly-amide-imide | Poly-imide | Poly-imide | Non-linear type poly-ester | Polyparabanic type (Type E) | Poly-imide | Non-linear type poly-ester | Outer layer: polyimide Inner layer: adhesive layer | Poly-imide | Outer layer: polyimide Inner layer: polyester-imide |
| Size Thickness (μ) | 49[a] 15 | 50 | 52 | 60 rectangular tube 2mm×4mm | 70 | 55 | 40 | 200 | 60 | 40 | 40 | 50[a] 10 | 20 | 10[a] 30 |
| Inner diameter (mm) | 0.5 | 1.0 | 1.0 | | 1.0 | 0.5 | 0.2 | 2.0 | 1.2 | 1.0 | 0.5 | 0.8 | 0.6 | 0.5 |
| Physical property Tensile strength (Kg) | 1.9 | 2.5 | 2.7 | 8.2 | 5.0 | 1.6 | 1.0 | 1.2 | 5.5 | 2.0 | 1.0 | 3.0 | 0.3 | 0.9 |
| Elongation at break (%) | 110 | 70 | 115 | 106 | 122 | 100 | 120 | 63 | 110 | 75 | 90 | 120 | 83 | 80 |
| Breakdown voltage (KV) | 14 | 12 | 12 | 13 | 15 | 13 | 9 | >15 | 13 | 9 | 10 | 13 | 6 | 10 |
| Thermal[b] resistance (°C) | 243 | 236 | 243 | 221 | 209 | 243 | 243 | 166 | 205 | 220 | 175 | 243 | 223 | 243 |
| Cut-through temperature (°C) | >400 | >400 | >400 | 380 | 353 | >400 | >400 | 280 | 346 | >400 | 287 | >400 | >400 | >400 |

Note:
[a]The upper numeral shows the thickness of main layer and the lower numeral shows the thickness of adhesive layer.
[b]The upper and lower numerals show the thicknesses of the outer and inner layers, respectively.
[c]Temperature at which thermal life after ASTM D 2307-68 is 20,000 hours.

What is claimed is:

1. Resin tubes for thin wire electrical insulator comprising non-extrudable heat resistant resin varnish, said varnish being such that when it is applied and cured on American Wire Gauge No. 18, copper wire, thereby increasing the overall diameter of the wire by 0.003 inch, the resin layer formed will have a thermal life of at least 20,000 hours at 120° C and a cut-through temperature of at least 250° C, said tubes being seamless and having an inner diameter not greater than 5mm and a thickness not greater than 0.3mm.

2. A method for molding seamless heat resistant synthetic resin tubes from non-extrudable resin, said tubes having an inner diameter of not more than 5 mm. and a thickness of not more than 0.3 mm., comprising applying a heat resistant synthetic resin varnish on American Wire Gauge No. 18, copper wire, thereby increasing the overall diameter of the wire by 0.003 inches, the resin layer formed having a thermal life of at least 20,000 hours at 120° C, and a cut-through temperature of at least 250° C after curing, curing said resin varnish to form a synthetic resin layer on the metal wire, drawing the heat resistant synthetic resin coating and wire above the yield point of the metal wire and separating the resulting synthetic resin tube from the metal wire.

3. The method as claimed in claim 2, wherein the step (1) for forming the synthetic resin layer on the metal wire, at least two different heat resistant synthetic resin varnishes are applied and cured on the metal wire.

4. The method as claimed in claim 2, wherein said heat resistant synthetic resin varnish is an organic solvent soluble type varnish.

5. The method as claimed in claim 2, wherein said heat resistant synthetic resin varnish is a water soluble varnish.

6. The method as claimed in claim 2, wherein said heat resistant synthetic resin varnish is a varnish of precursor of imide group-containing synthetic resins.

7. The method as claimed in claim 2, wherein said heat resistant synthetic resin varnish is selected from the group consisting of a varnish of precursor of polyhydantoin, a precursor of non-linear type polyester and a polyparabanic acid.

8. The method as claimed in claim 2, wherein said heat resistant synthetic resin varnish is a varnish of precursor of polyimide resin.

9. The method as claimed in claim 2 wherein the drawing beyond the yield point is effected by winding said resin coated metal wire around a first roll and then winding around a second roll, the circumferential speed of said first and second rolls being different, and rotating said rolls to draw said metal wire continuously.

10. The method as claimed in claim 2 wherein said drawing above said yield point is effected by passing said resin coated metal wire through a die.

11. The method as claimed in claim 21, wherein after separation of the resin from the metal wire is completed, the resulting heat resistant synthetic resin is heat treated at a temperature within a range of 100° to 300° C.

12. The method as claimed in claim 2, wherein the metal wire is a copper wire having a circular cross-section.

13. The method as claimed in claim 2, wherein, the metal wire is coated and baked with a silicone prior to prior to application of heat resistant varnish.

14. A seamless heat resistant synthetic resin tube having a thickness of not more than 0.3 mm and an inner diameter of not more than 5.0 mm produced in the methods as claimed in claims 2.

15. The tube as claimed in claim 14, wherein the resin is selected from the group consisting of polyimide, polyamideimide, polyesterimide, polyesteramideimide, non-linear type polyester, polyparabanic acid and polyhydantoin.

16. The tube as claimed in claim 14, wherein the heat resistant resin layer is constituted with at least two different heat resistant resin layers.

17. The tube as claimed in claim 14, wherein said heat resistant resin is polyimide.

18. A method for molding composite of heat resistant synthetic resin tubes, said heat resistant resin being non-extrudable, said tubes having an inner diameter of not more than 5 mm. and a thickness of not more than 0.3 mm., comprising:
   1. forming at least two synthetic resin coated wires by applying a heat resistant synthetic resin varnish on American Wire Gauge No. 18, copper wire, thereby increasing the overall diameter of the wire by 0.003 inches, the resin layer formed having a thermal life of at least 20,000 hours at 120° C, and a cut-through temperature of at least 250° C after curing, on each of at least two metal wires,
   2. contacting said resin coated metal wires mutually in parallel and then curing said resins to form integrally adhering resin coated composite wires,
   3. drawing said integrally adhering resin coated composite wires above the yield point of said metal wires, and
   4. separating the integrally adhered resin tubes from the metal wires to produce composite resin tubes.

19. The method as claimed in claim 18, wherein before the step (1) the metal wire is coated with a silicone.

20. A composite of synthetic resin tubes produced by the method as claimed in claim 18, wherein at least two seamless heat resistant synthetic resin tubes, each having a wall thickness of not more than 0.3 mm, are tightly adhered in parallel at the longitudinal direction.

21. A method for molding a double layer heat resistant synthetic resin tube, consisting of an inner tube of a thermally adhesive resin and an outer tube of a non-extrudable heat resistant resin, said inner tube having an inner diameter of not more than 5 mm. and a thickness of not more than 0.3 mm., a comprising:
   1. applying a thermally adhesive resin layer on American Gauge No. 18 wire and baking said resin to form a thermally adhesive resin layer on the metal wire,
   2. applying a heat resistant synthetic resin, said varnish being such that when it is applied and cured on the thermally adhesive resin coated wire thereby increasing the overall diameter of the thermally adhesive coated wire by 0.003 inches, and curing said resin varnish to form the heatresistant synthetic resin layer having a thermal life of at least 20,000 hours at 120° C and a cut-through temperature of at least 250° C on the thermally adhesive resin layer,
   3. drawing the thus obtained double layer synthetic resin coated wire above the yield point of the metal wire, and
   4. separating the resulting double layer synthetic resin tube from the metal wire.

22. The method as claimed in claim 21, wherein before the step (1), the metal wire is coated with a silicone.

23. The method as claimed in claim 21, wherein the thermally adhesive synthetic resin is selected from the group consisting of phenoxy resin, polysulfone resin, polyamide resin and epoxy resin.

24. The tube as claimed in claim 21, wherein said thermally adhesive synthetic resin is selected from the group consisting of phenoxy resin, polysulfone resin, polyamide resin and epoxy resin.

25. A method for molding a double layer heat resistant synthetic resin tube consisting of an inner tube of a heat resistant non-extrudable resin, and an outer tube of a thermally adhesive synthetic resin, said inner tube being seamless and having an inner diameter of not more than 5 mm. and a thickness of not more than 0.3 mm., comprising:
 1. applying a heat resistant synthetic resin varnish, on American Wire Gauge No. 18, copper wire, thereby increasing the overall diameter of the wire by 0.003 inches, the resin layer formed having a thermal life of at least 20,000 hours at 120° C and a cut-through temperature of at least 250° C when cured, and curing said resin varnish to form the synthetic resin layer,
 2. applying a thermally adhesive synthetic resin on the synthetic resin coated wire and baking the thermally adhesive resin to form the thermally adhesive resin layer on the heat resistant synthetic resin layer,
 3. drawing the resulting double layer synthetic resin coated wire above the yield point of the metal wire, and
 4. separating the resulting double layer synthetic resin tube from the metal wire.

26. The method as claimed in claim 22, wherein before the step (1), the metal wire is coated with a silicone.

27. The method as claimed in claim 25, wherein the thermally adhesive synthetic resin is selected from the group consisting of phenoxy resin, polysulfone resin, polyamide resin and epoxy resin.

28. The tube as claimed in claim 25, wherein said thermally adhesive synthetic resin is selected from the group consisting of phenoxy resin, polysulfone resin, polyamide resin and epoxy resin.

* * * * *